United States Patent [19]

Hennig

[11] Patent Number: 4,536,803
[45] Date of Patent: Aug. 20, 1985

[54] METHOD AND APPARATUS FOR INTENSIFYING CONTRAST IN PRINTING FORMATS

[75] Inventor: Eberhard Hennig, Ascheberg, Fed. Rep. of Germany

[73] Assignee: Dr. -Ing. Rudolf Hell GmbH, Fed. Rep. of Germany

[21] Appl. No.: 507,471

[22] Filed: Jun. 24, 1983

[30] Foreign Application Priority Data

Jul. 9, 1982 [EP] European Pat. Off. ........ 82105964.9

[51] Int. Cl.³ ............................................. H04N 1/40
[52] U.S. Cl. .................................... 358/299; 358/284
[58] Field of Search ............... 358/299, 280, 284, 287, 358/80

[56] References Cited

U.S. PATENT DOCUMENTS

| | | | |
|---|---|---|---|
| 2,691,696 | 10/1954 | Yule | 358/80 |
| 2,892,887 | 6/1959 | Hell | 358/298 |
| 2,962,548 | 11/1960 | Taudt | 358/284 |
| 3,153,698 | 10/1964 | Hall et al. | 358/80 |
| 3,170,032 | 2/1965 | Evans, Jr. et al. | 358/280 |
| 4,005,475 | 1/1977 | Knop | 358/80 |
| 4,054,916 | 10/1977 | Knop | 358/284 |
| 4,122,496 | 10/1978 | Childress | 358/283 |
| 4,222,077 | 9/1980 | Yamada | 358/280 |
| 4,335,407 | 6/1982 | Atoii et al. | 358/284 |
| 4,403,258 | 9/1983 | Balzau | 358/284 |
| 4,484,232 | 11/1984 | Gast | 358/284 |

OTHER PUBLICATIONS

H. R. Schindler, "Optical Scanning of Continuous--Tone and Line Documents with Spacial Frequency Separation for Improved Data Handling and Compaction", IBM Technical Disclosure Bulletin vol. 20, No. 12, 5/78.

Primary Examiner—Howard W. Britton
Assistant Examiner—Edward L. Coles
Attorney, Agent, or Firm—Hill, Van Santen, Steadman & Simpson

[57] ABSTRACT

A method and apparatus for intensifying contrast during the recording of masters in electronic image processing wherein a master is scanned opto-electronically and an image signal is produced as well as two unsharp masking signals by scanning a first unsharp masking area and an enlarged second unsharp masking area around the current image point. Differential signals are generated from the image signal and each of the two unsharp masking signals and the two differential signals thus formed are mixed together in a selected ratio. The mixed signal is divided into positive and negative correction components which can be differently amplified and after comparison to threshold signals are combined to form a correction signal which has an effective width which depends on the mixing ratio. The mixing ratio may for example, be dependent on the gradient and/or the contrast of a master contour. The correction signal thus formed is then superimposed on the image signal so as to provide contrasted intensification and the contrast enhancement can be matched to the properties of the master by controlling the effective width of the correction signal.

19 Claims, 10 Drawing Figures

METHOD AND APPARATUS FOR INTENSIFYING CONTRAST IN PRINTING FORMATS

BACKGROUND OF THE INVENTION

1. Field of the Invention

This invention relates in general to electronic production of printing forms and in particular to the reproduction by engraving devices and scanners and particularly relates to a method and apparatus for intensifying contrast during the reproduction of masters.

2. Description of the Prior Art

In electronic printing form production using engraving devices and scanners, the masters to be produced are scanned point-by-point and line-by-line with opto-electronic scanning means and the image signal thus obtained is corrected according to the requirements of the reproduction process. The corrected image signal controls a recording element which rerecords the master on a recording medium.

Generally, the masters to be reproduced are a combination of continuous-tone images and written characters or line elements of graphic representations. Both continuous-tone images as well as written characters or line elements have contours which make reproduction difficult.

The contrast at contours particularly in fine details is already reproduced in the photographic production of a film master as compared to the original causing reduction due to the unsharpness in the film layers as well as due to enlargement or transfer copying. Also, the resolution of the opto-electronic scanning element is limited due to scattered light and due to the unsharpness of the scanning lens such that further reduction of contrast appears at contours during reproduction and the human eye interprets this as a lack of sharpness.

Thus, it is necessary to regain the reduced contrast or, respectively, the reduced image sharpness in the printing form production or of even increasing it relative to the original for editorial reasons.

For purposes of intensifying contrast or respectively, sharpness by electronic unsharp masking technique, it is already known from U.S. Pat. No. 2,691,696 to scan the surround field called unsharp masking area of the current image point with a correspondingly larger unsharp masking diaphragm in addition to scanning the current image point with an image point diaphragm so as to form a differential signal from the unsharp masking signal and the image signal and to superimpose it to a selectable amount on the image signal as a correction signal for intensifying contrast. This method which corresponds to unsharp masking in photographic reproduction technology results in an improvement of the detail contrast or, respectively, of the image sharpness at a contour or outline since a dark image change and a light image change in the direct proximity of a discontinuity of tonal value or, respectively, recorded darker and brighter than they are at some distance from the discontinuity in tonal value.

In this prior art known solution, the amplitude of the correction signal depends only on the amplitude of the tonal value or, respectively, the image signal discontinuity so that hard contours of line elements and written characters where great skips in tonal value occurs are normally overemphasized, but soft contours such as in continuous-tone images which have small skips of tonal value are only slightly corrected in such system.

In practice, however, it is a matter of particularly importance to boost the detail contrast at soft contours in continuous-tone images since written characters and line elements are more sharply reproduced anyway. So as to be able to achieve the desired effect in continuous-tone images it requires that the available corrections signal be superimposed on the image signal at full strength or full value in this prior art method. In this case, however, hard contours arise, for example, at highlights and at white edges or margins which is disruptive around the black written characters and these are particularly noticeable when, for example, black print is placed in a gray scale.

In practice, also, it would be desirable to obtain a contrast boost at soft contours or continuous-tone images having a high effective width of the correction signal but in contrast to undertake a contrast boost with a small effective width of the correction signal at hard contours of line elements and written characters such that the disruptive edges and margins would be considerably reduced.

In the prior art method, the effective width of the correction signal or, respectively, the width of the image signal intensification is rigidly prescribed by the diameter of the unsharp masking diagram utilized and can only be altered by changing the size of the diagram.

The prior art method therefore has the disadvantage that the contrast boost can be optimized in amplitude and the effective width of the correction signal only for continuous-tone regions or for line regions of the master and not for both.

It has been proposed to improve the known method by distorting amplitude limitation or by means of an asymmetrical treatment of the correction signal as well as by influencing the correction signal as a function of a switch mask as described in German LP No. 949443, German LP No. 1039842 or German LP No. 2226990, but difficulties continue in that disruptive edges or margins still occur and this is undesirable.

SUMMARY OF THE INVENTION

The present invention relates to a method and apparatus for rerecording masters which allows optimum contrast boost or, respectively, sharpness intensification can be achieved both at contours for continuous-tone images as well as for written characters or line elements. In the invention, a master is scanned and an image signal is obtained and then two separate unsharp masking signals are obtained which are produced by using diaphragms of different shapes. The image signal is combined with each of the unsharp masking signals and supplied to a mixer stage wherein a first combined signal is produced after which a second combined signal is produced by obtaining negative and positive signals and then recombining them and controlling the signals with variable gain amplifiers in which the gain is controlled by function generators. The recombined signals are then combined with the image signal and supplied to a recording apparatus which produces the recorded signal.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
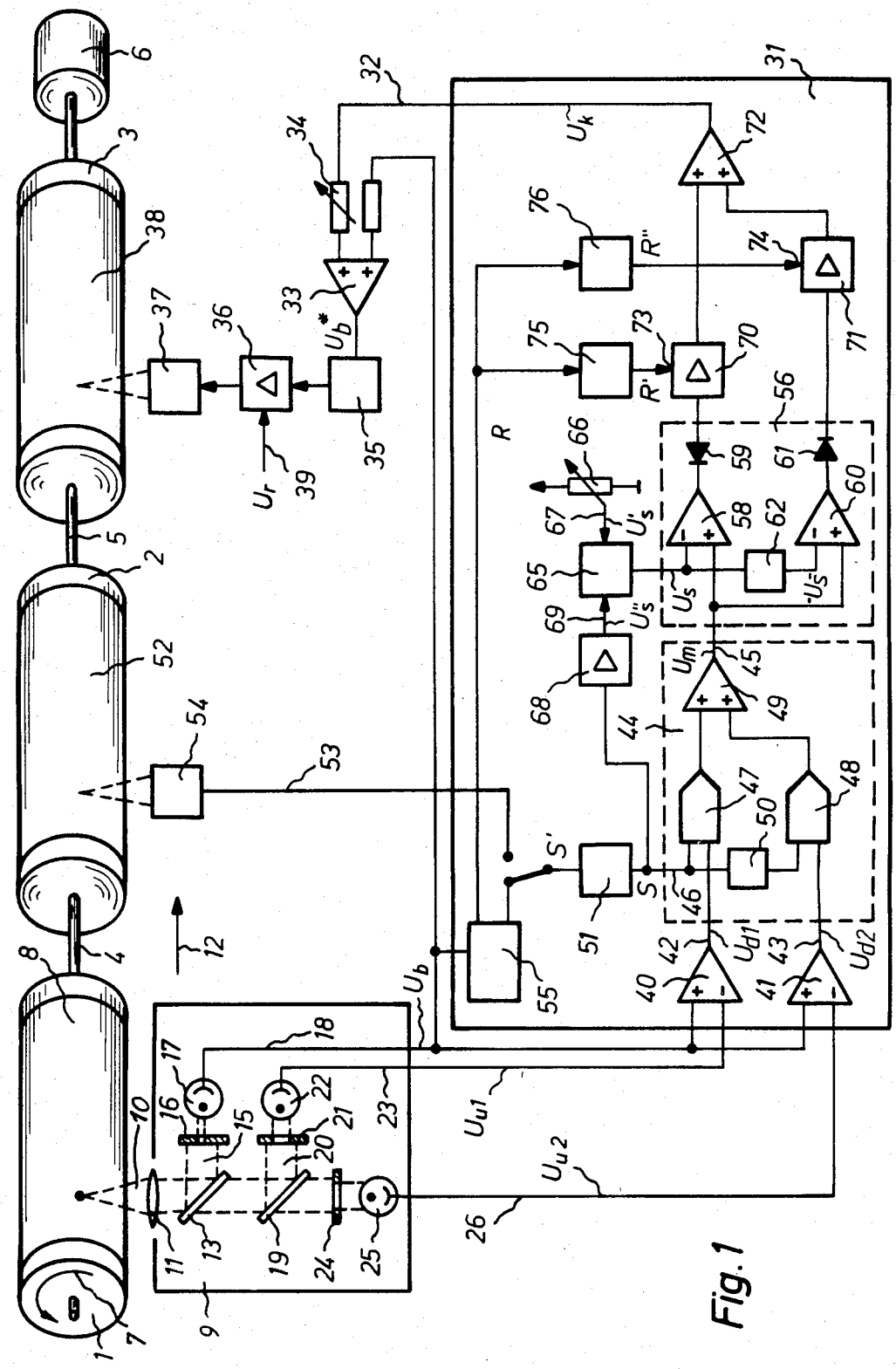
FIG. 1 is a block diagram of the image reproduction device of the invention.

FIG. 1 illustrates in block form the apparatus for reproducing images with a correction stage for contrast intensification.

As shown, mounted on a shaft 4 is a scanning drum 1 upon which a master 8 can be mounted. The master 8 may include continuous-tone images, written characters and line elements. The master 8 is opto-electronically scanned point-by-point and line-by-line by scanning means 9 which moves back and forth in the direction of the arrow 12 relative to the master 8 and the scanning drum rotates so that the scanning means 9 will scan different lines. The scanning light beam is modulated with brightness information from the master 8 and passes through a lens 11 into the scanning means 9 in which an image signal $U_b$ is produced. Also, produced are a first unsharp masking signal $U_{u1}$ and a second unsharp masking signal $U_{u2}$. The scanning means 9 moves in the axial direction of shaft 4 back and forth over the master 8 to scan it point-by-point and line-by-line in the direction of the arrow 12.

In the sample embodiment, the scanning means 9 for black and white masters includes a semi-reflective mirror 13 mounted at 45° relative to the beam of the light reflected from the master and the mirror 13 allows some of the light to pass therethrough and reflects a portion of the light comprising a first light bundle 15 out of the scanning light beam 10. The first sub-bundle 15 impinges upon an image point diaphragm 16. The component of the first sub-bundle 15 which passes through the opening of the image point diaphragm 16 impinges upon an opto-electronic transducer 17 which converts it into the image signal $U_b$ and supplies it to a conductive line 18. The image signal $U_b$ is a measure of the brightness of an elementary scanning area on the master 8 and is referred to as an image point which has the size determined by the aperture of the image point diaphragm 16.

A second semi-reflective mirror 19 is mounted in the path of the light beam which passes through the mirror 13 and it allows a portion of the light to pass therethrough and reflects a portion of the light into a partial sub-bundle 20. The sub-bundle 20 impinges upon a first unsharp masking diaphragm which has an aperture larger than that of the image point diaphragm 16. The component of the second sub-bundle 20 which passes through the aperture of the first unsharp masking diaphragm 21 impinges upon a second opto-electronic transducer 22 which converts the light into a first unsharp masking signal $U_{u1}$ and supplies it to a line 23. The first unsharp masking signal $U_{u1}$ is proportional to the mean brightness of the first surround field region or unsharp masking area which is determined by the size of the aperture of the first unsharp masking diaphragm 21 which is larger than the elementary scanning region. The surround field region can also be referred to as an image point region since it comprises a plurality of image points surrounding the principle image point.

The scanning light which passes through the semi-reflective mirror 19 passes through the aperture of a second unsharp masking diaphragm 24 and impinges on a third opto-electronic transducer 25 where it is converted into a second unsharp masking signal $U_{u2}$ and is supplied to a line 26. The aperture of the second unsharp masking diaphragm 24 is larger than that of the first unsharp masking diaphragm 21 so that an even larger second unsharp masking area or, respectively, image point region is included around the instant image point.

Figure 2:
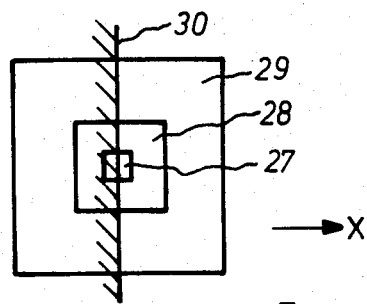
FIG. 2 illustrates surround field regions.

FIG. 2 illustrates the elementary scanning region 27 or image point and also illustrates the first unsharp masking area 28 which is concentric with the elementary scanning region 27. Also, illustrated is the second unsharp masking area 29 which is even larger than the first unsharp masking area 28. In FIG. 2, the image point and the first and second unsharp masking areas are illustrated as quadratic shapes but it is to be realized that they can also be circular or have any other desired shape. A contour line 30 on the master (black/white discontinuity) is also indicated and due to the relative movement between the master and scanning means it will be delineated in the X-direction.

FIG. 3A comprises a curve illustrating the image signal $U_b$. FIG. 3B comprises a signal obtained at the output of transducer 22 which is the first unsharp masking signal $U_{u1}$. FIG. 3C illustrates the second unsharp masking signal $U_{u2}$. All of the signals illustrated are illustrated as a function of the distance X and as illustrated in FIG. 2, the contour line 30 moves across the unsharp masking areas. Two image signal discontinuities (I; II) having different levels are illustrated with the solid line and by broken line.

A correction stage 31 receives the signals $U_b$, $U_{u1}$ and $U_{u2}$ and produces a correction signal $U_k$ on its output line 32. The correction signal $U_k$ is superimposed on the image signal $U_b$ in an adder 33 so as to boost the contrast at contours, in other words, for steepening or intensifying the image signal discontinuities. A resistor is in the path of the image signal $U_b$ and a potentiometer 34 is in the signal path of the correction signal $U_k$ so as to allow the amplitude of the signal $U_k$ to be controlled before adding it with the image signal $U_b$. The output of the adder 33 comprises a steepened or intensified image signal $U^*_b$ which is supplied to a gradation stage 35 where it is modified by an amount which depends on the reproduction process being used and it is then supplied to a final amplifier 36 which has a variable gain and can be controlled by a raster signal $U_r$. The output of the amplifier 36 is supplied to a recording element 37 which performs point-by-point and line-by-line recording the master 8 on a recording medium 38 which is mounted on the recording drum 3. The recording element 37 moves in synchronism with the scanning means 9 but the mechanical drive for these members is not illustrated since they are well known to those skilled in the art. The recording element 37 moves in synchronism to scan the recording medium on the recording drum 3 and the drums 1, 2 and 3 are driven with a driving means 6 which drives them in synchronism. The drums 2 and 3 are connected by a shaft 5 and the drums 1 and 2 are connected by the shaft 4.

When the described image reproduction device is an engraving device for producing rastered printing forms, the recording element 37 is, for example, an electromagnetic engraving element which has an engraving stylus as the cutting tool for the raster points or it may be an energy beam generator which has an energy beam which forms the raster points by means of material evaporation. When on the other hand, the scanner is for producing rastered or unrastered printing forms, the recording element may be a light source which is brightness modulated by the image signal which exposes photograph film material.

So as to produce the printing raster, a raster signal $U_r$ is supplied to line 39 to control and superimpose in the final amplifier 36 the raster signal on the image signal $U^*_b$.

The correction stage 31 includes a pair of variable gain differential amplifiers 40 and 41. The first differential amplifier receives the image signal $U_b$ on its plus input and the first unsharp masking signal $U_{u1}$ on its negative input. The differential amplifier 41 receives the image signal $U_b$ on its plus input and the second unsharp masking signal $U_{u2}$ on its negative input. The differential amplifier 40 produces and supplies on its output lead 42 a first differential signal $U_{d1}$ and the differential amplifier 41 supplies to its output lead 43 a second differential signal $U_{d2}$. The signals $U_{d1}$ and $U_{d2}$ are formed according to equation (1) and the weighting factors $g_1$ and $g_2$ correspond to the amplification factors of the differential amplifiers 40 and 41.

$$U_{d1} = g_1 (U_b - U_{u1})$$

$$U_{d2} = g_2 (U_b - U_{u2}) \qquad (1)$$

FIG. 3D illustrates the signal $U_{d1}$ and FIG. 3E illustrates the signal $U_{d2}$ wherein the curves shown in broken line illustrate the higher image signal discontinuities.

FIG. 3F illustrates the superposition of the image signal $U_b$ and differential signal $U_{d1}$ or, respectively, $U_b$ and $U_{d2}$ which occurs in the adder 33 for the purpose of image steepening intensification for the assumed case where the differential signals $U_{d1}$ and $U_{d2}$ are not further modified in the correction stage 31. It can be seen from FIGS. 3D, 3E and 3F that the differential signals $U_{d1}$ and $U_{d2}$ have different effective widths in the X-direction because the two unsharp masking areas around the current image point have different sizes such that the effective widths of the differential signals $U_{d1}$ and $U_{d2}$ in the selected sample embodiment are determined by the apertures of the two unsharp masking diaphragms 21 and 24.

So as to produce a variable effective width for the correction signal $U_k$ which is limited by the effective widths of the first and second unsharp masking areas, the differential signals $U_{d1}$ and $U_{d2}$ are combined in a first mixer stage 44. The mixer stage 44 produces a mixed signal $U_m$ on lead 45 which is formed according to equation 2 as a function of a control signal S which determines the mixing ratio which has standardized end values of $S=0$ and $S=1$. The control signal S is supplied on line 46 and the mixing ratio determines the effective width of the correction signal $U_k$.

$$U_m = S \cdot U_{d1} + (1-S) U_{d2} \qquad (2)$$

In the sample embodiment, the mixer stage consists of a first multiplication means 47 which receives the control signal S on one input and the first differential signal $U_{d1}$ on its second input and supplies its output to an adder 49. A second multiplier 48 receives the second differential signal $U_{d2}$ from line 43 and a $(1-S)$ signal which is received from the inverter 50 which is connected to lead 46. The signal $(1-S)$ is formed in the inverter 50. These output signals of the multiplication elements 47 and 48 are added in the adder 49 so as to obtain the mixed signal $U_m$ which is supplied to lead 45.

The control signals which varies between the final values of $S=0$ and $S=1$ has a linear or an arbitrary progression which, for example, can be generated from the control signal S' in a distortion stage 51. When using the final limiting values of the control signal S, either the first differential signal $U_{d1}$ which has small effective width or the second differential signal $U_{d2}$ which has high effective width appear at the output of the mixer stage 44 as the mixed signal $U_m$. When an intermediate value of the control signal S occurs, a value of the mixed signal $U_m$ which corresponds to the mixing ratio occurs and the width will vary between the limiting value widths.

The mixer stage 44 can also function only as a change-over when the control signal S' is switched back and forth between the end values of $S=0$ and $S=1$.

The control signal S' is optionally produced by means of mask scanning or by means of evaluating the contours in the master.

When mask scanning is used, a control mask 52 is scanned for producing the control signal S' which is supplied on line 53 from an opto-electronic scanning element 54 which scans point-by-point and line-by-line as well as synchronously and in registration with the master 8 so that the scanner 54 moves in the direction of the arrow 12 with the scanner 9 and the recording element 37 in a well known manner. For the simplest case, the master regions to be corrected with the low effective width of the first differential signal $U_{d1}$ are contained in the control mask 52 as white information and the master regions to be corrected with high effective width of the second differential signal $U_{d2}$ are contained as black information.

When scanning a black/white control mask, a control signal S' changes discontinuously between the end values of $S=0$ and $S=1$ and the corresponding differential signals $U_{d1}$ and $U_{d2}$ are switched in the mixer stage 44. In a modification, the control mask 52 contains additional gray scale information determining the mixing ratio and intermediate values of the control signal S' are obtained by scanning such information. An alternate to mask scanning is to provide the control signal S' by means of a mask memory.

For a control signal S' produced by means of locating and evaluating contours in the master, a contour evaluation stage 55 is provided and the state 55 receives the image signal $U_b$. The gradience or slopes for intensification and/or the contrasts or density skips of the master contours are identified in the contour evaluation stage 55 by evaluating the image signal $U_b$ and the control signal S' is produced such that the identified gradient and or contrast respectively determine the mixing ratio of the differential signals $U_{d1}$ and $U_{d2}$ and, thus, the effective width of the correction signal $U_k$. For example, a low effective width results with a steep contour but in contrast a high effective width for the correction signal $U_k$ occurs when a flat contour exists. Alternately, to gradient or contrast, the mixing ratio could be made to depend on the upward or downward path of specific limiting densities. The switch illustrated allows the input to the distortion stage 51 to be obtained from lead 53 or from the contour evaluation stage 55.

Figure 3:
FIGS. 3A through 3F comprise graphs illustrating signal curves.
Figure 3:
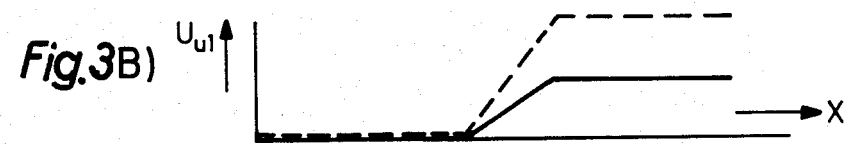
Figure 3:
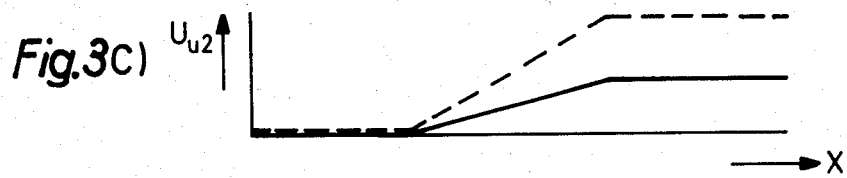
Figure 3:
Figure 3:
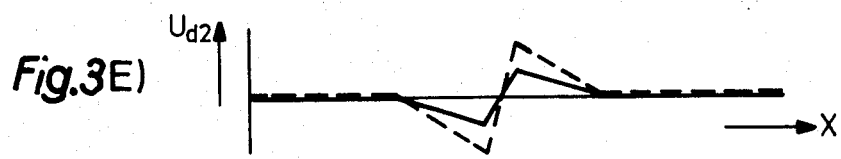
Figure 3:
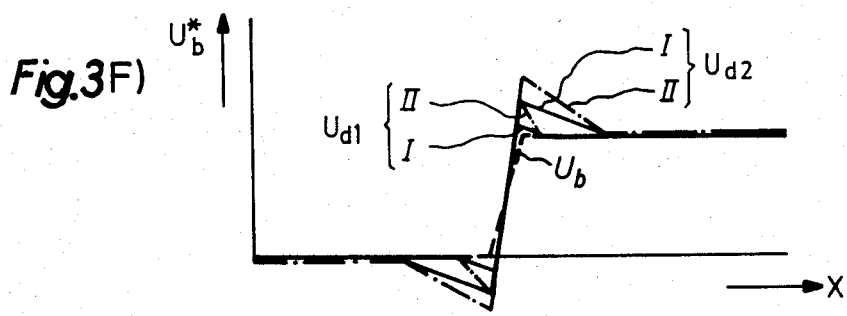
Figure 4:
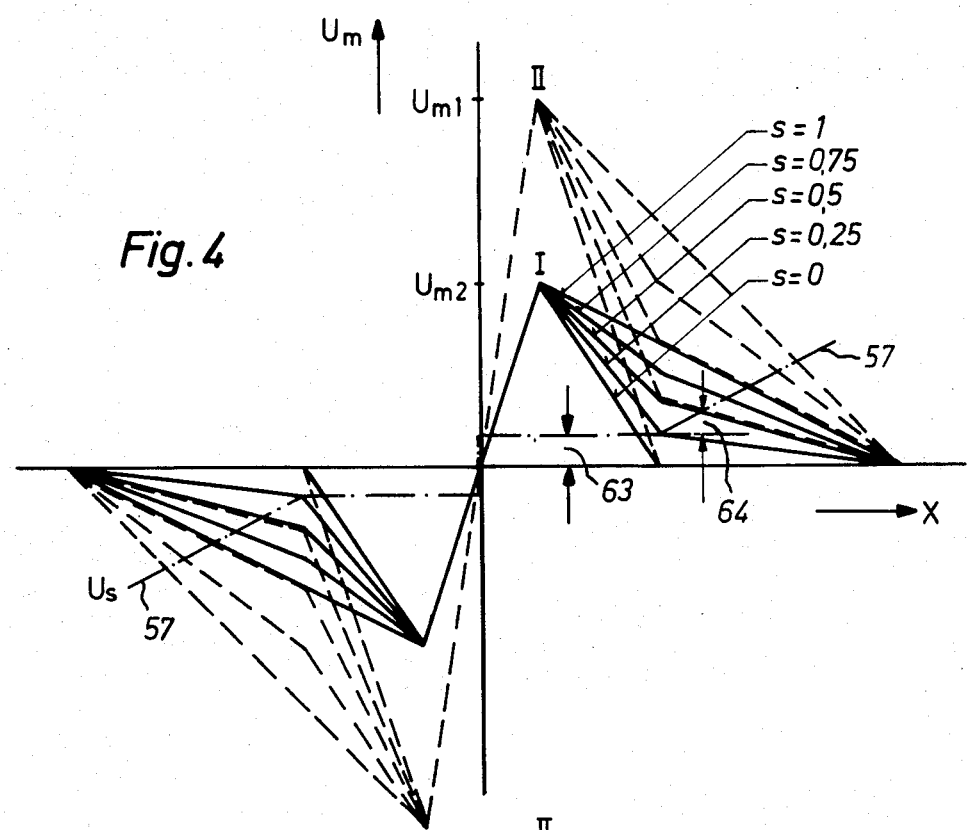
FIG. 4 comprises a graph illustrating signal curves for defining the invention.

FIG. 4 comprises a plot of the differential signals $U_{d1}$ and $U_{d2}$ as a function of five characteristic control signal values S and the scale has been enlarged relative to the graphs of FIG. 3. The five values for S are S=1, 0.75, 0.5, 0.25 and 0. The solid line and broken line curves are associated with the different image signal discontinuities I and II identified in FIG. 3.

The mixing ratios of the differential signals $U_{d1}$ and $U_{d2}$ are compiled in the following table for five characteristic control signal values S.

| Control Signal | Mixing Proportions % | |
| S | $U_{d1}$ | $U_{d2}$ |
|---|---|---|
| 0 | 100 | 0 |
| 0.25 | 25 | 75 |
| 0.50 | 50 | 50 |
| 0.75 | 75 | 25 |
| 1.0 | 0 | 100 |

For the control signal value S=0, the curve of the signal $U_m$ corresponds to the first differential signal $U_{d1}$ which has the lower effective width illustrated in FIG. 3D. For the control signal value S=1, the curve of the mixed signal $U_m$ corresponds to the second differential signal $U_{d2}$ which has a higher effective width as illustrated in FIG. 3E. Various mixed signals $U_m$ for example, for the control signal having values of S=0.25; S=0.5 and S=0.75 lie between the limiting curves of S=0 and S=1 as illustrated.

It can be observed from the graph that the mixed signal $U_m$ can at first be available only with two different effective widths, but, however various pulse shapes deviating from a "triangular pulse shape" can be formed by mixing the differential signals $U_{d1}$ and $U_{d2}$ by selecting the pulse shapes by selection of the control signal value S so as to produce signal by superposition wherein the image signal has different effective widths.

For the purpose of producing true differing effective widths for the correction signal $U_k$, the mixer stage 44 supplies an output to a threshold circuit 56, wherein the mixed signal $U_m$ is split into positive and negative correction components and these are each compared to a positive or a negative threshold $+U_s$ or $-U_s$. FIG. 4 is a plot of the curve of the threshold signals $\pm U_s$ which is indicated by dash-dot line 57.

The threshold circuit 56 consists of a first differential amplifier 58 which receives the signal $U_m$ and which is connected to a diode 59. A second differential amplifier 60 also receives the signal $U_m$ and is connected to a diode 61. The diodes 59 and 61 are poled in opposite direction. The differential amplifiers 58 and 60 respectively receive the mixed signal $U_m$ and also the amplifier 58 receives a positive threshold signal $+U_s$ from the threshold generator 65 and the differential amplifier 60 receives a $-U_s$ signal from the inverter 62 which receives the output of the threshold generator 65. As illustrated in FIG. 4, the threshold signal $U_s$ is composed of a variable constant voltage $U'_s$ shown by curve 63 and of a voltage $U''_s = g_3 S$ and is indicated by curve 64 which is dependent on the control signal S. The threshold signal $U_s = U'_s$ is for the condition of $U_{d1} \neq 0$ and $U_s = (U'_s + U''_s)$ is for the condition where $U_{d1} = 0$. The threshold signal $U_s$ is obtained in threshold signal generator 65 which receives a constant voltage $U'_s$ on lines 67 from an adjustable potentiometer 66 across which a suitable voltage is applied. The generator 65 also receives the voltage $U''_s$ from line 69 which is derived from control signal S after it has passed through an amplifier 68 which has an amplification factor $g_3$.

The correction components generated in the threshold circuit 56 are selectively amplified in amplifiers 70 and 71 and are added to form the correction signal $U_k$ in the adder 72 which can be designed as a balance regulator and which supplies an output of the correction signal $U_k$ on line 32.

Figure 5:
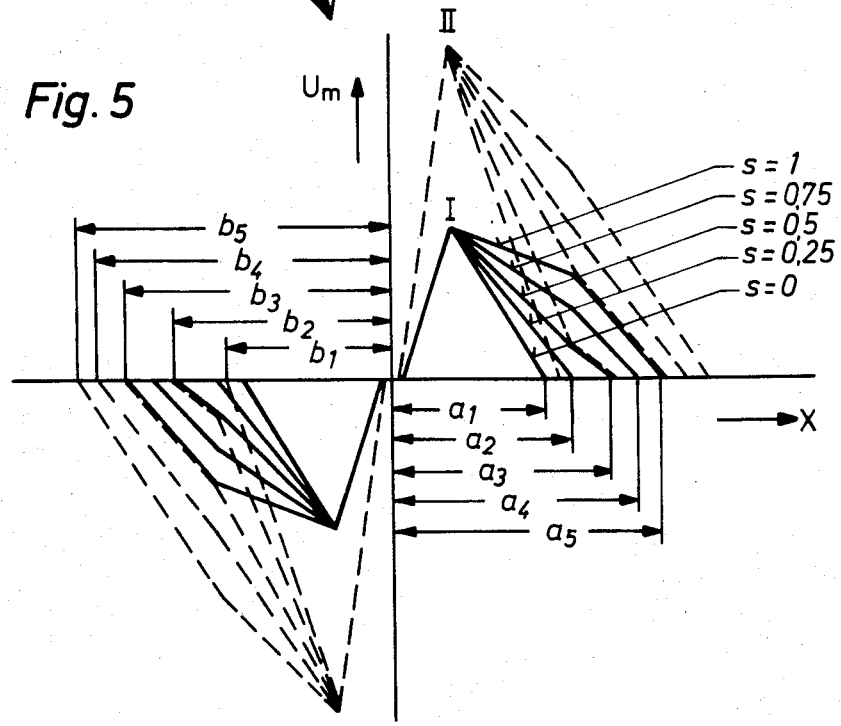
FIG. 5 illustrates signal curves for describing the invention.

FIG. 5 comprises a plot of the correction signal $U_k$. It can be observed that different effective widths $a_1$ through $a_5$ result as a function of the control signal value S for a small image signal discontinuity (I) and $b_1$ through $b_5$ for high image signal discontinuity (II).

The amplifiers 70 and 71 allow the positive and negative correction components to be independently adjusted so as to obtain symmetrical or asymmetrical contrast enhancement. For this purpose, the amplification factors of the amplifiers 70 and 71 are controllable with inputs 73 and 74 which can be manually adjusted by potentiometers or by regulating signals.

It is expedient to vary the positive and negative components as a function of the mean brightness of the master upon elimination of the contours. For this purpose, a signal R dependent on the mean brightness of the master is generated from the image signal $U_b$ in the contour evaluation stage 55. In two differently set function generators 75 and 76, the signal R is converted into two regulating signals R' and R" so as to control the amplification factors of the two amplifiers 70 and 71. The amplification factor of the amplifier 70 for the positive correction component is constant. For example, from "black" up to a specific gray scale value lying in the proximity of "white" and decreases down to zero from the gray scale value to "white". The amplification factor of the amplifier 71 for the negative correction component increases from "black" to a gray scale value lying in the proximity of "black" and it is then constant from this gray scale value up to "white".

By means of the asymmetrical contrast enhancement there is achieved as a function of the brightness that the positive correction component for a contour lying close "white" and the negative correction component for a contour lying close to "black" is respectively weakened in comparison to the other correction component.

It is to be realized that the particular scanning means 11 for simultaneous unsharp masking area evaluation is merely an example and the invention is not to be limited thereby. In the optical structure, annulus-like mirrors can also be employed in place of the semi-reflecting mirrors with the aperture of the annulus-like mirrors in the center of the mirror determining the elementary scanning region or image point and the annulus surface determining a unsharp masking area.

For the purpose of simultaneously acquiring the image point environment, the scanning means 9 can also be equipped with a photodiode array or with a photodiode matrix. Another embodiment for the scanning means may consist of a traditional scanning element which generates only one image signal. The image signal values of a plurality of lines or line sections adjacent to the currently scanned line can be intermediately stored in line memories which follow the scanning element. Also, the scanning element can be followed by a so-called full image memory in which all image signal values of a master are deposited. In both instances, the unsharp masking signals are calculated from the stored image signal values which fall in the unsharp masking areas. Such unsharp masking areas calculations are disclosed for example in German LP No. 2137676. Of course, a scanning means for color scanning can also be employed instead of a scanning means for black/white scanning.

Although the invention has been described with respect to preferred embodiments, it is not to be so limited as changes and modifications can be made therein which are within the full intended scope as defined by the appended claims.

I claim as my invention:

1. A method for intensifying contrast during the recording of masters, wherein a master is opto-electronically scanned image-point-by-image-point and line-by-line in order to generate an image signal and a correction signal which is superimposed on the image signal for intensifying contrast, comprising the steps of
   (a) generating a first unsharp masking signal ($U_{u1}$) by means of identifying the mean brightness of a first unsharp masking area (28) surrounding the respective image point on said master;
   (b) generating a second unsharp masking signal ($U_{u2}$) by means of identifying the mean brightness of a second unsharp masking area (29) surrounding said respective image point and which is larger than said first unsharp masking area (28);
   (c) forming a first differential signal ($U_{d1}$) from the image signal ($U_b$) and the first unsharp masking signal ($U_{u1}$);
   (d) forming a second differential signal ($U_{d2}$) from the image signal ($U_b$) and the second unsharp masking signal ($U_{u2}$);
   (e) mixing multiples of the first and second differential signals ($U_{d1}$; $U_{d2}$) with each other in a selectable ratio to obtain a mixed signal ($U_m$); and
   (f) generating the correction signal ($U_k$) from said mixed signal ($U_m$).

2. A method according to claim 1, comprising the steps of comparing the mixed signal ($U_m$) to a threshold signal ($U_s$) to obtain the correction signal ($U_k$) which has a variable effective width dependent on the mixing ratio.

3. A method according to claim 2, wherein the mixing ratio depends on the density gradients of a contour in the scanned master.

4. A method according to claim 2, wherein the mixing ratio is dependent on the contrast of the scanned master.

5. A method according to claim 2, wherein the mixing ratio is derived from information obtained by scanning a control mask.

6. A method according to claim 1 comprising:
   (a) multiplying the first differential signal ($U_{d1}$) by a control signal (S) which determines the mixing ratio and multiplying the second differential signal ($U_{d2}$) by a signal (1−S) derived from the control signal (S); and
   (b) adding the signals obtained by multiplying to produce the mixed signal ($U_m$).

7. A method according to claim 1 comprising the steps of:
   (a) splitting the mixed signal ($U_m$) into positive and negative correction components;
   (b) comparing separately the positive and negative correction components to corresponding positive or negative threshold signals ($U_s$); and
   (c) adding the positive and negative correction components to obtain the correction signal ($U_k$).

8. A method according to claim 7, wherein the threshold signal ($U_s$) has a constant value when the first differential signal ($U_{d1}$) differs from zero and the threshold signal rises from the constant value as a function of the mixing ratio when the first differential signal ($U_{d1}$) is zero.

9. A method according to claim 7 wherein the positive and negative correction components are differently amplified for asymmetrical contrast enhancement.

10. A method according to claim 9, wherein the amplification depends on the mean brightness of the scanned master.

11. A method according to claim 1 wherein the unsharp masking signals ($U_{u1}$, $U_{u2}$) are generated by additionally scanning the master with unsharp masking diaphragms, whereby the diaphragm apertures respectively determine the unsharp masking areas.

12. A method according to claim 1 comprising calculating the unsharp masking signals ($U_{u1}$, $U_{u2}$) from the image signal values of the image points lying in the respective unsharp masking areas.

13. Apparatus for intensifying contrast during the recording of masters, consisting of a scanning means having an opto-electronic transducer for producing an image signal, a signal correction stage connected to the output of the scanning means for generating a correction signal, and a superposition stage receiving the image signal from said scanning means and said correction signal from the signal correction stage, comprising:
   (a) a first signal source (22) in said scanning means (9) for generating a first unsharp masking signal ($U_{u1}$) from the mean brightness of a first unsharp masking area surrounding the scanned image point;
   (b) a second signal source (23) in said scanning means (9) for generating a second unsharp masking signal ($U_{u2}$) from the mean brightness of a second unsharp masking area surrounding the scanned image point and said second unsharp masking area being larger than the first unsharp masking area and said signal correcting stage comprises,
   (c) a first differential amplifier (40) forming a first differential signal ($U_{d1}$) from the image signal ($U_b$) generated in said scanning means (9), and said first unsharp masking signal ($U_{u1}$) generated in the first signal source (22).
   (d) a second differential amplifier (41) forming a second differential signal ($U_{d2}$) from the image signal ($U_b$) generated in said scanning means (9) and the second unsharp masking signal ($U_{u2}$) generated in said second signal source (23);
   (e) a mixer stage (44) receiving and mixing the first and second differential signals ($U_{d1}$, $U_{d2}$) from said first and second differential amplifiers (40; 41) as a function of a control signal (S) which determines the mixing ratio, and
   (f) a control signal generator (51; 52; 54; 55) connected to the mixer stage (44).

14. Apparatus according to claim 13, comprising,
   (a) a threshold circuit (56) connected to the output of the mixer stage (44) for splitting the mixed signal ($U_m$) into positive and negative correction components and in order to compare these components to threshold signals ($U_s$);
   (b) an adder (70) connected to the output of the threshold circuit (56) to produce the correction components; and (c) a generator (62, 65, 66, 68) producing the threshold signals ($U_s$) and supplying them to said threshold circuit (56).

15. Apparatus according to claim 14, comprising amplifiers (70, 71) inserted in the signal paths of the correction components at the outputs of said threshold circuits (56), to independently amplify the correction components.

16. Apparatus according to claim 14 wherein said mixer stage (44) consists of the following components,
    (a) a first multiplier (47) connected to the output of the control signal generator (51, 52, 54, 55) and to the output of the first differential amplifier (40);
    (b) an inverter stage (50) connected to the output of the control signal generator;
    (c) a second multiplier (48) connected to the output of said inverter stage (50) and to the output of the second differential amplifier (41); and
    (d) an adder (49) connected to the outputs of said first and second multipliers (47, 48).

17. Apparatus according to claim 14 wherein the control signal generator is an evaluation circuit (55) for contours in the master and receives the image signal from said scanning means (9).

18. Apparatus according to claim 14 wherein the control signal generator is a scanning means which scans a control mask (52, 54).

19. Apparatus according to claim 13 wherein,
    (a) the first signal source (22) contains a first unsharp masking diaphragm (21) having an aperture which determines the first unsharp masking area and contains an opto-electronic transducer (22) for producing the first unsharp masking signal ($U_{u1}$); and
    (b) the second signal source (25) contains a second unsharp masking diaphragm (24) having an aperture which determines the second unsharp masking area and contains a further opto-electronic transducer (25) for producing the second unsharp masking signal ($U_{u2}$).

* * * * *